F. C. GAMMONS.
CLEANING AND SEPARATING KAPOK FIBER FROM ITS SEED AND IMPURITIES.
APPLICATION FILED MAY 24, 1907.

907,330.

Patented Dec. 22, 1908.

3 SHEETS—SHEET 1.

F. C. GAMMONS.
CLEANING AND SEPARATING KAPOK FIBER FROM ITS SEED AND IMPURITIES.
APPLICATION FILED MAY 24, 1907.

907,330.

Patented Dec. 22, 1908.
3 SHEETS—SHEET 2.

Witnesses

Inventor
Ferdinand C. Gammons
By
his Attorneys

F. C. GAMMONS.
CLEANING AND SEPARATING KAPOK FIBER FROM ITS SEED AND IMPURITIES.
APPLICATION FILED MAY 24, 1907.
907,330.
Patented Dec. 22, 1908.
3 SHEETS—SHEET 3.
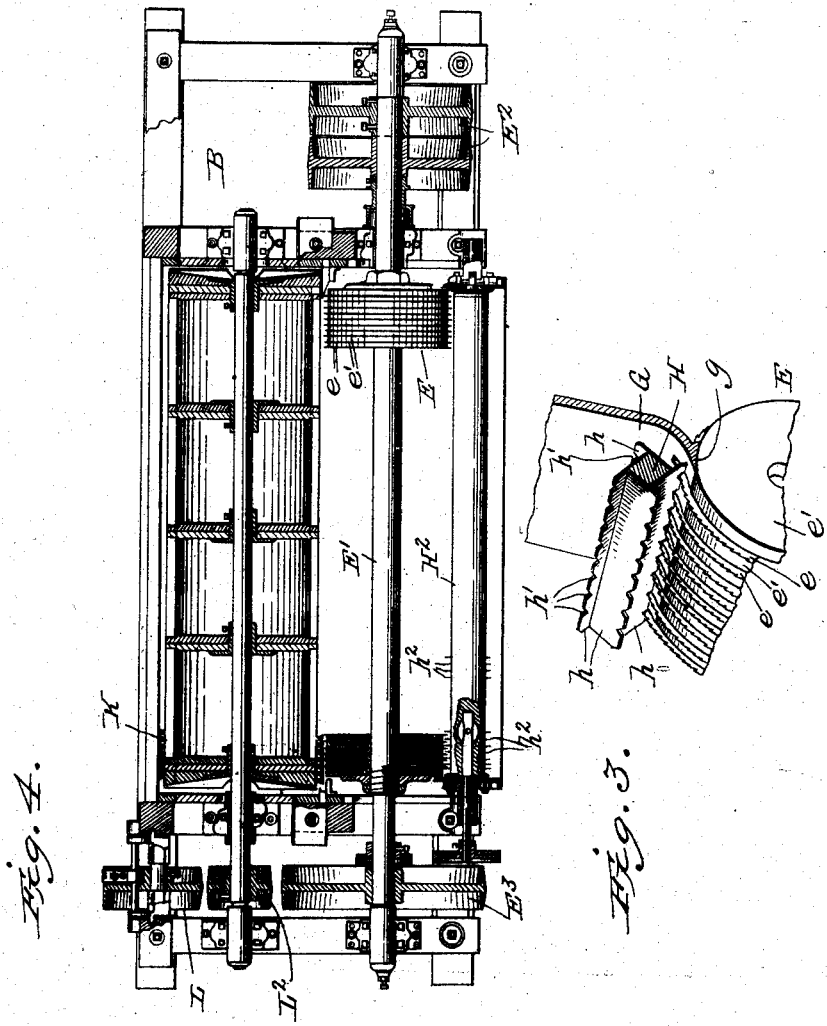
Witnesses
Elizabeth Griffith
Melville D. Church
Inventor
Ferdinand C. Gammons
By Church & Church
his Attorneys

UNITED STATES PATENT OFFICE.

FERDINAND C. GAMMONS, OF BRIDGEWATER, MASSACHUSETTS, ASSIGNOR TO CONTINENTAL GIN COMPANY, OF BIRMINGHAM, ALABAMA, A CORPORATION OF DELAWARE.

CLEANING AND SEPARATING KAPOK FIBER FROM ITS SEED AND IMPURITIES.

No. 907,330.   Specification of Letters Patent.   Patented Dec. 22, 1908.

Application filed May 24, 1907. Serial No. 375,532.

*To all whom it may concern:*

Be it known that I, FERDINAND C. GAMMONS, of Bridgewater, in the county of Plymouth, State of Massachusetts, have invented a certain new and useful Improvement in Cleaning and Separating Kapok Fiber from its Seed and Impurities; and I do hereby declare the following to be a full, clear, and exact description of the same, reference being had to the accompanying drawings, forming a part of this specification, and to the figures and letters of reference marked thereon.

This invention relates to improvements in apparatus for cleaning or separating fine fibrous substances from the seed and other material of a non-fibrous character, the apparatus of the present invention being particularly designed for handling a silky fiber most generally known as kapok, the tree bearing the same being of the genus *Eriodendron* of which there are several fiber bearing species. While the fiber is abundant the commercial value of the same has been limited by the difficulties heretofore encountered in quickly and cheaply separating from the seed portions of the pod, and other impurities mingled therewith when gathered.

The seed readily separate from the fiber and the fiber is apt to adhere strongly to portions of the pod, but as between the fibers themselves there is little or no felting quality or tendency to cling together or adhere one to another and therefore apparatus such as has heretofore been used for ginning cotton has been found of little practical value in handling this particular fiber. The result is that the fiber heretofore marketed has been very imperfectly separated from the seed and impurities by a primitive method of beating up the fiber in a receptacle and allowing the seed etc. to gravitate to the bottom of the receptacle.

Figure 1:
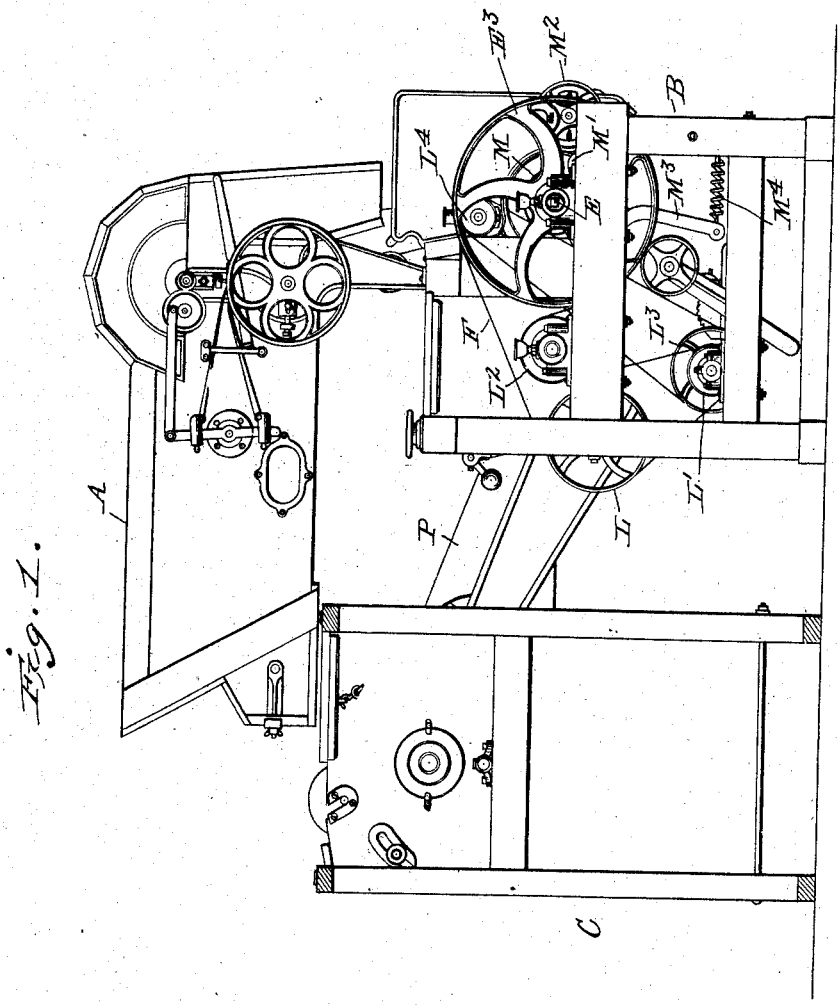
Figure 2:
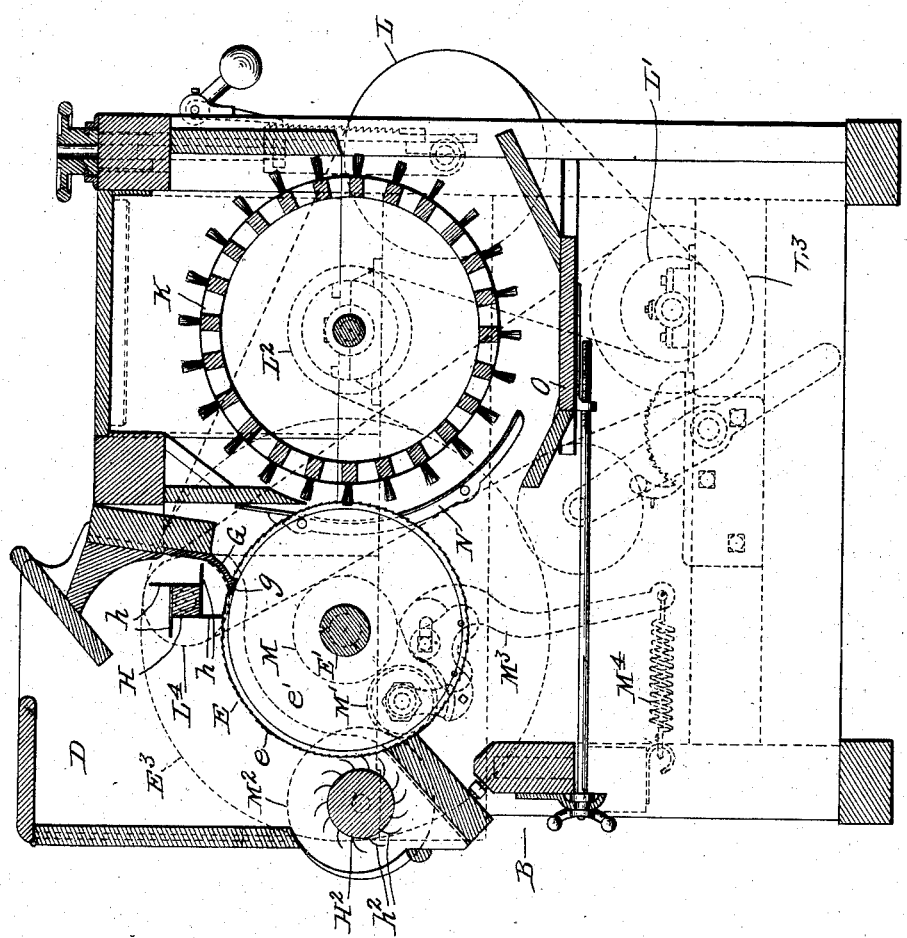

Referring to the accompanying drawings: Figure 1 is an end elevation of a complete apparatus for handling kapok in accordance with the present invention. Fig. 2 is a vertical section through the body of the machine looking toward the left hand end, the point of view being opposite to that of Fig. 1. Fig. 3 is a detail perspective view of a fragment of the saws, notched plate and wiper, as they appear in the chamber which corresponds to the roll box in an ordinary cotton gin. Fig. 4 is a horizontal section through the brush, saw, cylinder etc., some parts being broken away and some shown in elevation to illustrate details of construction more clearly.

Like letters of reference in the several figures indicate the same parts.

As shown in Fig. 1, the complete apparatus preferably embodies a feeder A for advancing the fibrous material in its raw state to the separating and ginning mechanism B, and a condenser C to which the cleaned and ginned fiber is delivered. Said feeder and condenser are of the well known types now in common use in connection with cotton ginning machinery and therefore specific description or illustration of the mechanical details of the same is unnecessary.

The mechanism for cleaning and ginning the fiber is shown in detail in Figs. 2, 3 and 4, and by reference to these figures of the drawing, it will be seen that the raw fiber is delivered by the feeder into a chamber D, through the lower portion of which a saw cylinder E extends. This saw cylinder is composed of alternately arranged saws $e$ and space rings $e'$ mounted on a through shaft $E'$, journaled in the frame and rotated from any suitable source of power through pulleys $E^2$. At the opposite end of the shaft from pulleys $E^2$ is a pulley $E^3$, from which through gearing shown in Fig. 1, the brush, wiper and huller or spiked roller are driven, as will presently appear.

The space rings $e'$ of the saw cylinder are of but slightly less diameter than the saws, thus where twelve inch saws are employed, spacing rings of eleven and one half inch diameter have been found to give good results.

No ribs such as are employed in cotton gins are necessary, but above the saw cylinder, a concave comb or notched plate G is mounted on the breast in position for the downwardly and forwardly projecting teeth or projections $g$ (see Fig. 3) to enter between the saws and lie in proximity to the space rings. Comparatively narrow spaces are left through the comb or concave around the teeth of the saws.

Immediately in front of the concave is a wiper, preferably in the form of a roll H having tangential blades or wings $h$, provided with notches $h'$ for the passage of the saws. The wiper is so positioned that the blades will pass close to the saw cylinder and concave, the projections or portions of the blades between the notches preferably passing into the spaces between the saws and as closely as possible to the space rings.

In front of the saw cylinder is a huller or spiked roller H² which practically bridges the discharge opening for the seed and trash, the spikes h² of the roller being curved backwardly to the direction of rotation of the roll and being set alternately lengthwise of the roll and opposite the spaces between the saws transversely of the roll. The ends of the spikes preferably pass into the spaces between the saws, while the roller itself is preferably but not necessarily located about on a level with the axis of the saw cylinder. The arrangement is designed with a view to insuring a proper action of the saws on the fiber, which fiber, it will be remembered has little or no tendency to cling together and hence will not readily lead into the saws after a portion has been engaged therewith. In rear of the saw cylinder is a brush K which in its location, arrangement and operation corresponds to the brushes in common use in cotton ginning machines.

While any preferred connecting gearing adapted to impart necessary rotation may be employed, in the arrangement shown, a belt F passes from the large pulley E³ on the saw shaft around idler L, pulley L' and pulley L² on the brush shaft. A second belt from a pulley L³ connected with pulley L', passes around a pulley L⁴ on the wiper roll shaft. The huller or spiked roll is preferably driven by friction pulleys M M' M², the first and last being located on the saw and roll shafts respectively, while the intermediate pulley M' is journaled on a bell crank lever M³ and is held up to its work by a spring M⁴.

The brush is partially inclosed by a segmental plate N at the front and through the upper part of which the saws travel while beneath the brush is an adjustable mote board O leading back to the duct P through which the lint is discharged to the condenser.

In operation the fiber fed into the chest above the saws is thrown by the huller or spiked roll against the saws. The saw teeth fill with fiber which is carried back under the wiper the latter knocking back all foreign material including the small seed; the fiber remaining on the saws is carried through the comb and finally removed by the brush and blown to the condenser. The machine does not carry a hard roll of fiber as does a cotton gin, but the roll carried is loose and fluffy and may well be termed a "romping roll."

The arrangement of the wiper with relation to the saws and comb is such that no clogging can occur. Said wiper thus not only prevents the accumulation of seed and other impurities in front of the comb where they would tend to accumulate because of the non-adherence or non-clinging character of the fiber, but it exerts a beating and willowing action on the mass aiding in the separation and leaving the fiber itself free to be carried off by the saws. In this connection it will be noted that the wiper is at the side of the roll box from which the fiber is drawn by the saws leaving the box unobstructed for the reception of the body of fiber which rests by gravity on or against the saw cylinder and forms, as before stated, a light fluffy roll, the arrangement being one which will permit the fibers to be carried bodily by the saws, even though there be no tendency of the fibers to cling together or lead.

What I claim as new and desire to secure by Letters Patent, is:—

1. In a machine for treating kapok and like silky fiber to separate the same from the seed and impurities, the combination with the roll box, saw cylinder on which the fiber in the box rests by gravity and comb between the teeth of which the saws travel, of a wiper located at that side of the box from which the fiber is withdrawn by the saws and having blades moving in a reverse direction to the saws and in proximity to the saws and teeth of the comb; substantially as described.

2. In a machine for treating kapok and like silky fiber to separate the same from the seed and impurities, the combination with the roll box, saw cylinder on which the fiber in the box rests by gravity embodying saws and space rings intermediate the saws and a comb having teeth projecting between the saws and into proximity to the space rings, of a wiper located at that side of the box from which the fiber is drawn by the saws and having blades moving in a reverse direction to the saws and in proximity to the comb teeth and saws; substantially as described.

3. In a machine for treating kapok and like silky fiber to separate the same from the seed and impurities, the combination with the roll box, saw cylinder on which the roll of fiber rests loosely by gravity embodying saws having projecting teeth and spacers intermediate the saws, of a wiper located at that side of the box from which the fiber is drawn by the saws rotating in reverse direction to the saw cylinder and having projecting portions passing between the saws and into proximity to the spacers.

4. In a machine for treating kapok and like silky fiber to separate the same from the seed and impurities, the combination with the saw cylinder embodying saws and spacers intermediate the saws, of a wiper rotating in reverse direction to the saw cylinder and having notched wiper blades, the projecting portions of which pass in between the saws.

5. In a machine for treating kapok and like silky fiber to separate the same from the seed and impurities, the combination with the saw cylinder embodying saws and spacers intermediate the saws, of a segmental comb plate having its teeth projecting in between the saws and a wiper having extended flat wiper blades adapted to operate in the concave side of the comb plate and having projecting portions adapted to pass in between the saws in proximity to the comb teeth.

6. In a machine for treating kapok and the like silky fiber to separate the same from the seed and impurities the combination with the roll box, saw cylinder projecting into the lower portion of the roll box, the comb having its teeth projecting between the saws and the rotary wiper located at one side of the roll box and having wiping blades traveling in proximity to the comb and saw cylinder and reversely to the saws, said comb and wiper being located above the saw cylinder, of a rotary spiked roller located in front of the saw cylinder and bridging the discharge opening for seeds and trash and a rotary brush located in rear of the saw cylinder for receiving the fiber from the saws; substantially as described.

FERDINAND C. GAMMONS.

Witnesses:
SAMUEL P. GATES,
FRANK E. SWEET.